April 22, 1958     W. RADMAN     2,831,420
FRANKFURTER COOKING DEVICE
Filed March 12, 1957     3 Sheets-Sheet 1

INVENTOR.
WILLIAM RADMAN
BY
*Salvatore G. Militano,*
ATTORNEY

April 22, 1958     W. RADMAN     2,831,420
FRANKFURTER COOKING DEVICE
Filed March 12, 1957     3 Sheets-Sheet 2

INVENTOR.
WILLIAM RADMAN
BY
ATTORNEY

April 22, 1958 W. RADMAN 2,831,420
FRANKFURTER COOKING DEVICE
Filed March 12, 1957 3 Sheets-Sheet 3
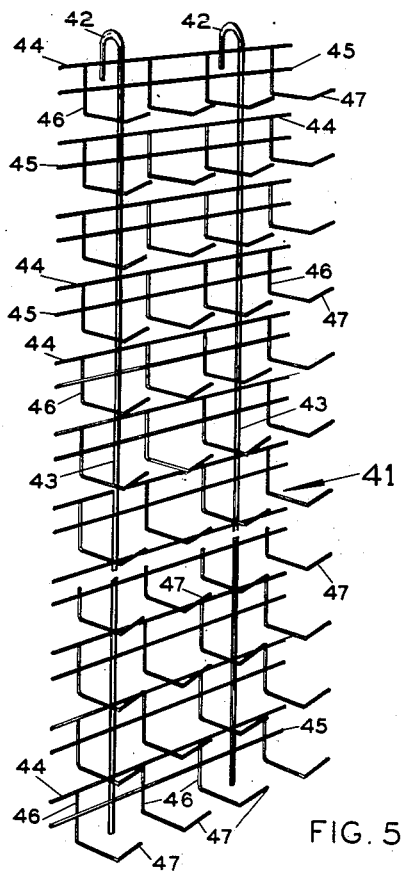
FIG. 5
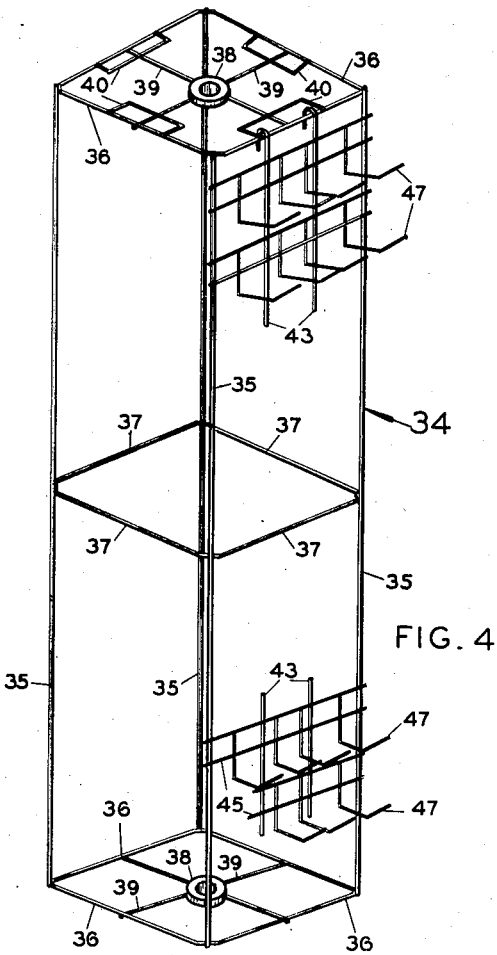
FIG. 4
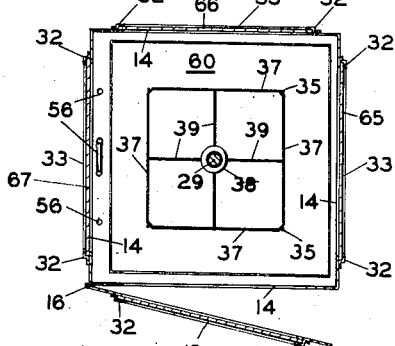
FIG. 6
FIG. 3
INVENTOR.
WILLIAM RADMAN
BY
Salvatore G. Militana
ATTORNEY United States Patent Office 2,831,420
Patented Apr. 22, 1958

2,831,420

FRANKFURTER COOKING DEVICE

William Radman, Miami, Fla.

Application March 12, 1957, Serial No. 645,605

2 Claims. (Cl. 99—357)

This invention relates to rotisseries and is more particularly directed to an automatic frankfurter cooking device.

A principal object of the present invention is to provide an electrically operated rotisserie for cooking frankfurters and the like which is capable of simultaneously cooking a relatively large number of frankfurters.

Another object of the present invention is to provide a frankfurter cooking device wherein its various parts such as its tray, racks, rack support and panels are removable thereby permitting the device to be readily and properly cleaned.

A further object of the present invention is to provide a frankfurter cooking device in which its frankfurter holding racks are removable so that the racks can be preloaded with frankfurters prior to inserting same in the device and upon completion of the cooking of the frankfurters, the racks are removed and other racks filled with uncooked frankfurters replaced therein.

A still further object of the present invention is the provision of a frankfurter cooking device described as above wherein a single cooking element may be used to cook frankfurters and the like contained in two such devices upon the removal of one of the panels from the frankfurter cooking devices.

A still further object of the present invention is to provide a frankfurter cooking device which maintains the frankfurters in a horizontal position without the necessity of piercing the frankfurter thereby reducing the loss of its juices during the cooking operation to a minimum.

With these and other objects in view, the invention will be best understood from a consideration of the following detailed description taken in connection with the accompanying drawings forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawings:

Figure 3 is a horizontal sectional view to a reduced scale taken along the line 3—3 of Figure 2.

Figure 4 is a perspective view of a rack support shown removed from its position in the cooking device with a portion of a rack shown mounted thereon.

Fig. 5 is a perspective view of a rack.

Figure 6 is a perspective view of a modification of my rack support.

Figure 1:
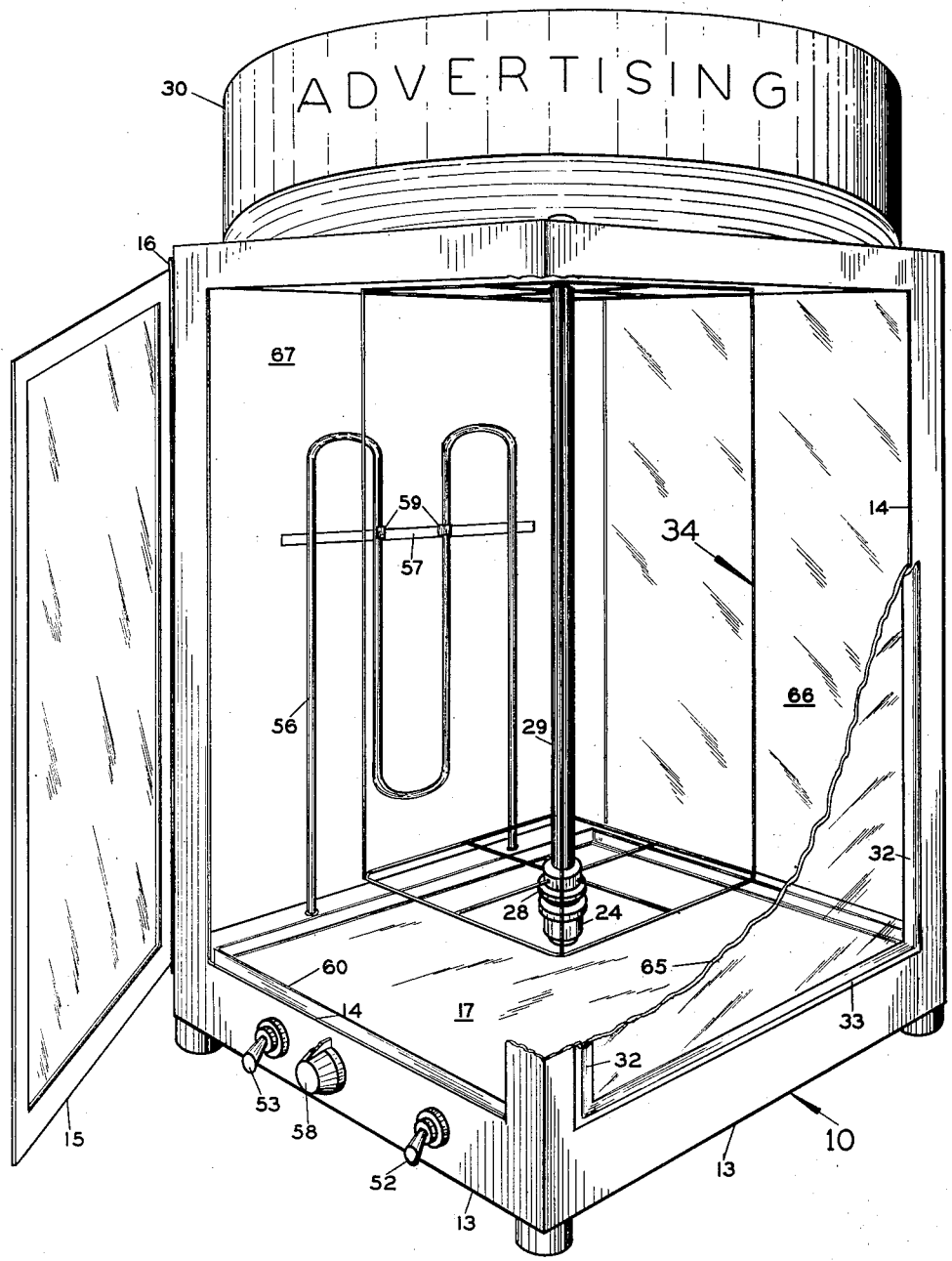
Figure 1 is a perspective view partially broken away of a frankfurter cooking device embodying my invention.

Referring to the drawings wherein like numerals are used to designate similar parts throughout the several views, the numeral 10 refers to my frankfurter cooking device consisting of a rectangular shaped casing or housing provided with a bottom wall 11, top wall 12 and side walls 13 to form a cooking chamber 17 therein. Each of the side walls 13 is provided with an opening 14. Three of the openings 14 are formed by a side flange 32 extending vertically on each side of the openings 14 and a bottom flange 33 extending horizontally along the lower side of the opening 14. The flanges 32 and 33 are spaced from the side walls 13 to form a slot for receiving the edges of panels which are fitted by sliding downwardly therein. On the front and one side wall 13, glass panels 65 and 66 are positioned thereon, while on the other side wall 13 a metal panel 67 is positioned thereon. On the rear side wall 13 of the device 10 there is a glass panelled door 15 pivotally mounted at one side by a hinge 16 to permit access to the enclosed chamber 17. The bottom wall 11 is spaced from the lower edges of the side walls 13 to form a lower enclosed chamber 18. The lower edges of the side walls 13 are turned inwardly to form a flange support for legs 20 for supporting the device 10 in spaced relation to a table or the like on which the cooking device 10 is mounted in order to inhibit the flow of heat to the article supporting the cooking device 10.

Approximately centrally positioned in the chamber 17 are bores 22 and 23 formed in the lower and upper walls 11 and 12 respectively, in whch bores are positioned bushings 24 and 25 respectively. A stub shaft 26 extends through and is journalled by the bushing 24 with its lower end being connected to a conventional reduction gear box 27 and its upper end having a collar 28 secured thereon for rotational movement with the stub shaft 26. The upper portion of the collar 28 receives the lower end of a shaft 29 which extends upwardly through the bushing 25 and terminating a short distance above the top wall 12. Mounted on the upper end of the shaft 29 is an open top pan 30, cylindrical in shape and provided with a depending socket 31 for receiving the free end of the shaft 29. The outside wall of the pan 30 may have any type of advertising matter printed thereon so that the rotating movement of the pan 30 will provide motion or animation to the matter contained thereon. Frankfurter rolls, buns and the like are placed on the pan 30 where they become warmed by heat rising and escaping from the frankfurter device 10.

Figure 2:
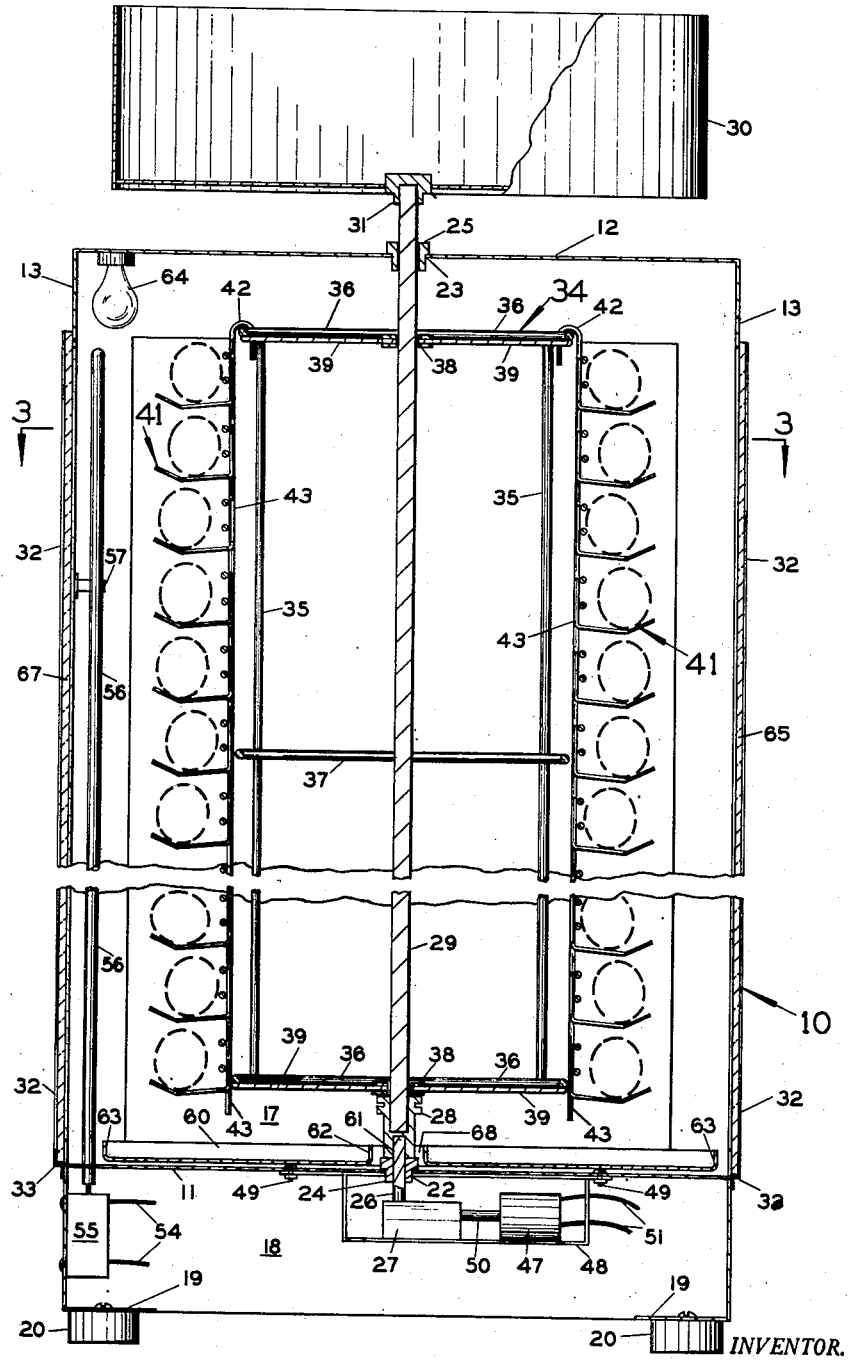
Figure 2 is a vertical cross-sectional view thereof taken along its center portion.

Mounted on the shaft 29 within the chamber 17 is a rack support 34 constructed of vertically disposed metal wire or rods 35 forming the corners of the rack support 34 and horizontally disposed rods 36 joining the ends of the rods 35 to form the ends of the support 34 with similar rods 37 at the midportion of the rods 35 for strengthening the cage-like support 34. In the center of the support 34 at each of the ends thereof is a collar 38 secured in position by stub rods 39 extending between the collar 38 and the end rods 36. The collars 38 are fitted on the shaft 29 as shown by Figures 1 and 2. On each of the end rods 36 at the upper portion of the support 34 is a U-shaped member 40 with its ends secured as by soldering to the end rods 36 and with its midpoint soldered to the stub rods 39.

The members 40 operate to properly position racks 41 thereon by receiving hooks 42 positioned at the upper ends of vertically disposed rods 43, whose lower ends extend below the lowermost rods 36.

Means are provided on the racks 41 for supporting a vertically disposed tier of frankfurters, each frankfurter lying horizontally, comprising a plurality of cross rods 44 and 45 extending horizontally and soldered to the vertical rods 43. To each of the cross rods 44 and 45 are secured L-shaped members 46 having a leg portion 47 extending upwardly from the horizontal in a direction away from the support 34, the leg portions being in the same horizontal plane and forming a support for a frankfurter as shown by dotted lines in Figure 2.

The operating mechanism for rotating the support 34 and racks 41 consists of an electric motor 47 mounted in a support 48 which is secured on the lower surface of the bottom wall 11 as by bolts 49. The motor 47 is provided with a motor shaft 50 connected to the reduction gear box 27 and is energized by means of electrical conductors 51 connected to a switch 52 mounted on the rear wall 13 of the device 10. A second switch 53 likewise mounted on the rear wall 13 is connected by wires 54 to a junction box 55 mounted on the side wall 32. Above the junction box 55 is mounted an electrical heating element 56 which extends upwardly along the panel 67 as shown by Figure 1 and secured thereto by clips 59 extending from a bracket 57, the ends of the heating element 56 entering the junction box 55 being connected to the electric wires 54. A heat control switch 58 is mounted on the rear wall 13 and connected (not shown) to the wires 54 so as to control the flow of electrical energy to the heating element 56 so that the temperature of the heat emanating from the heating element 56 may be controlled as desired.

Positioned within the chamber 17 on the bottom wall 11 is a pan 60 provided with an upstanding lip 62 disposed about a center opening 68 and a peripheral upstanding 63 about the outer edge of the pan 60 for catching and retaining juices and other food particles resulting from cooking frankfurters, etc.

In the normal operation of the frankfurter cooking device 10, the racks 41 are removed from the support 34 and loaded with frankfurters so that a frankfurter will be horizontally supported by the L-shaped members 46. The racks 41 are then returned to their position on the support 34. The switch 52 is then actuated to activate the motor 47 causing the motor shaft 50 and stub shaft 26 to rotate thereby effecting the rotation of the collar 28, shaft 29 and both the support 34 and the pan 30. The switch 53 is now actuated to energize the heating element 56 whereby the frankfurters commence to cook as they rotate about the chamber 17. While the frankfurters are being cooked, other racks 41 are filled with frankfurters and made ready to replace the racks of cooked frankfurters that are removed from the support 34. Heat that escapes upwardly through the top wall 12 will pass among the frankfurter rolls or buns placed in the pan 30. If the frankfurters are not being cooked as quickly or slowly as desired, the amount of heat at the heating element 56 may be varied upon rotation of the control switch 58.

After the cooking operation is completed the device 10 is dismantled in order to facilitate the cleaning thereof. The pan 30 is first lifted from the shaft 29 and the shaft 29 is pulled upwardly until free of the collar 28 and the bushing 25. The rack 34 is then removed from the chamber 17 and the pan 60 lifted from the bottom wall 11 and when freed of the collar 28, is removed from the chamber 17. The collar 28 is now removed as also the panels 65, 66 and 67 may be removed for cleaning purposes. Now the inner portion of the device 10 may be cleaned and scrubbed while the parts just removed from the device 10 are likewise scrubbed prior to being placed back into position.

In the event it is desired to utilize two cooking devices 10 with a single heating element 56 in operation, the panel 67 of both devices 10 are removed and the two devices 10 are placed side by side in contact relation with each other at the position of the openings 14 formed by the removed panels 67. The heat emanating from one heating element 56 will serve to cook the frankfurters in both cooking devices 10.

If it is desired that a frankfurter cooking device 10 be increased in size so as to increase its cooking capacity, its rack support 69 may be octagonal or any polygonal shape as shown by Figure 6. The rack support 69 consists of center hubs or collars 70 similar to the collars 38 of the rack support 34 with stub rods 71 extending radially outwardly of the collars 70 to whose ends horizontal rods 72 are welded to from the end portions which are joined together to form the support by vertical rods 72. The length of the rods 72 and consequently the number of sides of the rack support 69 is determined by the length of the frankfurters that are to be cooked therein. The rods 72 should be approximately equal in length to that of the frankfurter in order that the frankfurters may lie on the racks 41 without interference from frankfurters on adjoining racks 41. The racks 41 are hooked onto the upper rods 72 within members 74 of the rack support 69 which will hold 8 racks at one time.

Having described my invention what I claim as new is:

1. A frankfurter cooking device comprising a housing having side walls, a rear wall, a front wall and an upper and lower wall, a bore in said upper and lower walls, a bushing mounted in each of said bores, a stub shaft rotatably mounted in said lower bushing, power operated means connected to the lower end of said stub shaft, a collar mounted on the upper end of said stub shaft and extending therebeyond, a shaft removably mounted in said collar and extending through said upper bushing, a pan mounted on the upper end of said shaft, said pan adapted to contain frankfurter rolls and having a substantially circular side wall for receiving advertising matter thereon, a rack support, said rack support having a pair of spaced collars mounted on said shaft, a plurality of radially disposed rods extending from said collars, a plurality of horizontally disposed rods joining said radially disposed rods, a plurality of vertically disposed rods joining said horizontally disposed rods, and a plurality of frankfurter supporting racks removably mounted on said rack support.

2. The structure as recited by claim 1 wherein said frankfurter supporting racks comprise a plurality of vertically disposed rods, each of said rods having a hooked portion at its upper end for engaging said upper horizontally disposed rods of said rack support.

References Cited in the file of this patent

UNITED STATES PATENTS

| | | |
|---|---|---|
| 1,755,122 | Lichtman | Apr. 15, 1930 |
| 2,517,360 | Singer | Aug. 1, 1950 |

FOREIGN PATENTS

| | | |
|---|---|---|
| 209,138 | Switzerland | June 17, 1940 |